July 1, 1930.    E. C. F. SCHAEFER    1,769,715
MANURE SPREADER
Filed July 7, 1928    3 Sheets-Sheet 2
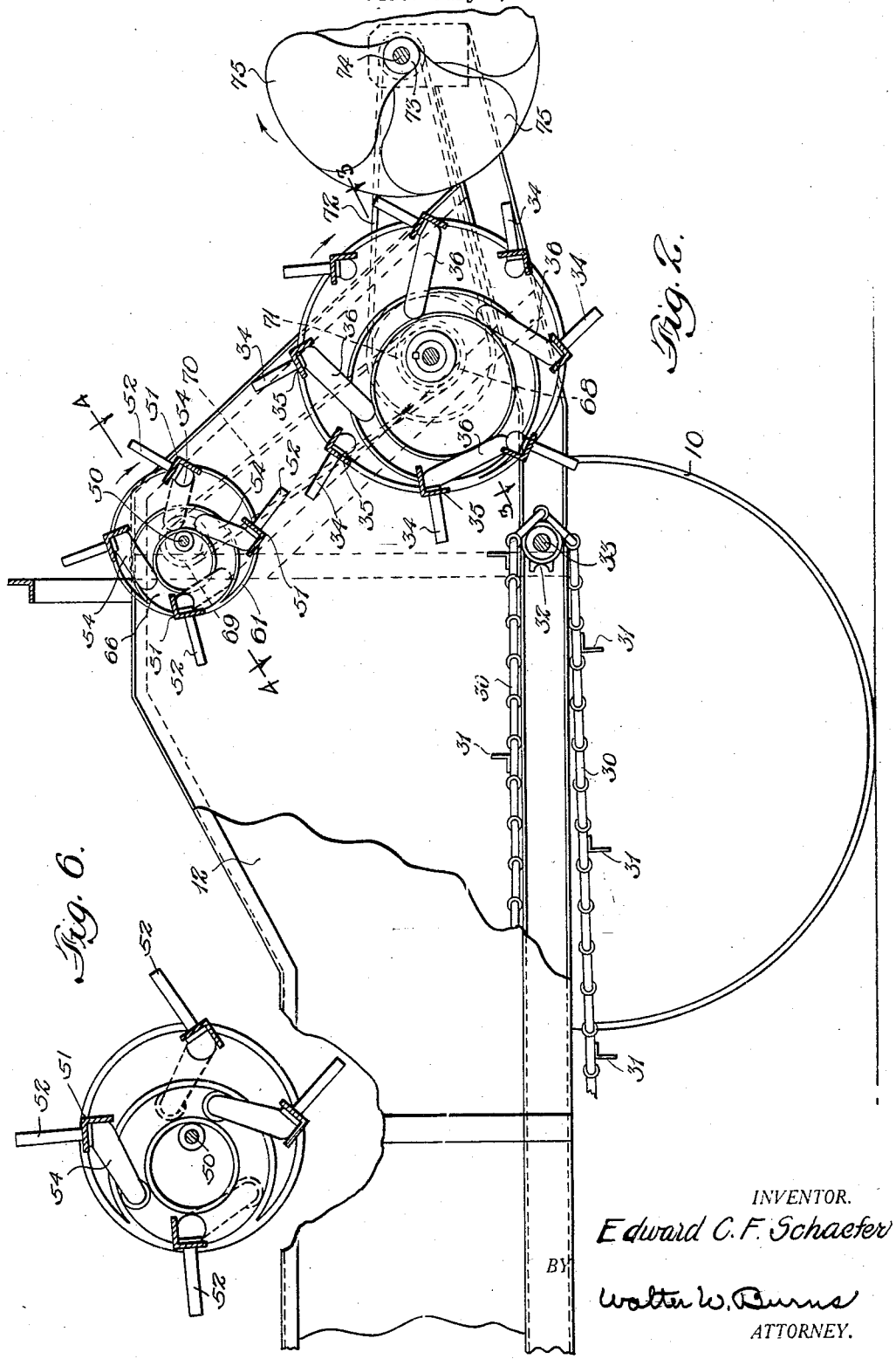
INVENTOR.
Edward C. F. Schaefer
BY
Walter W. Burns
ATTORNEY.

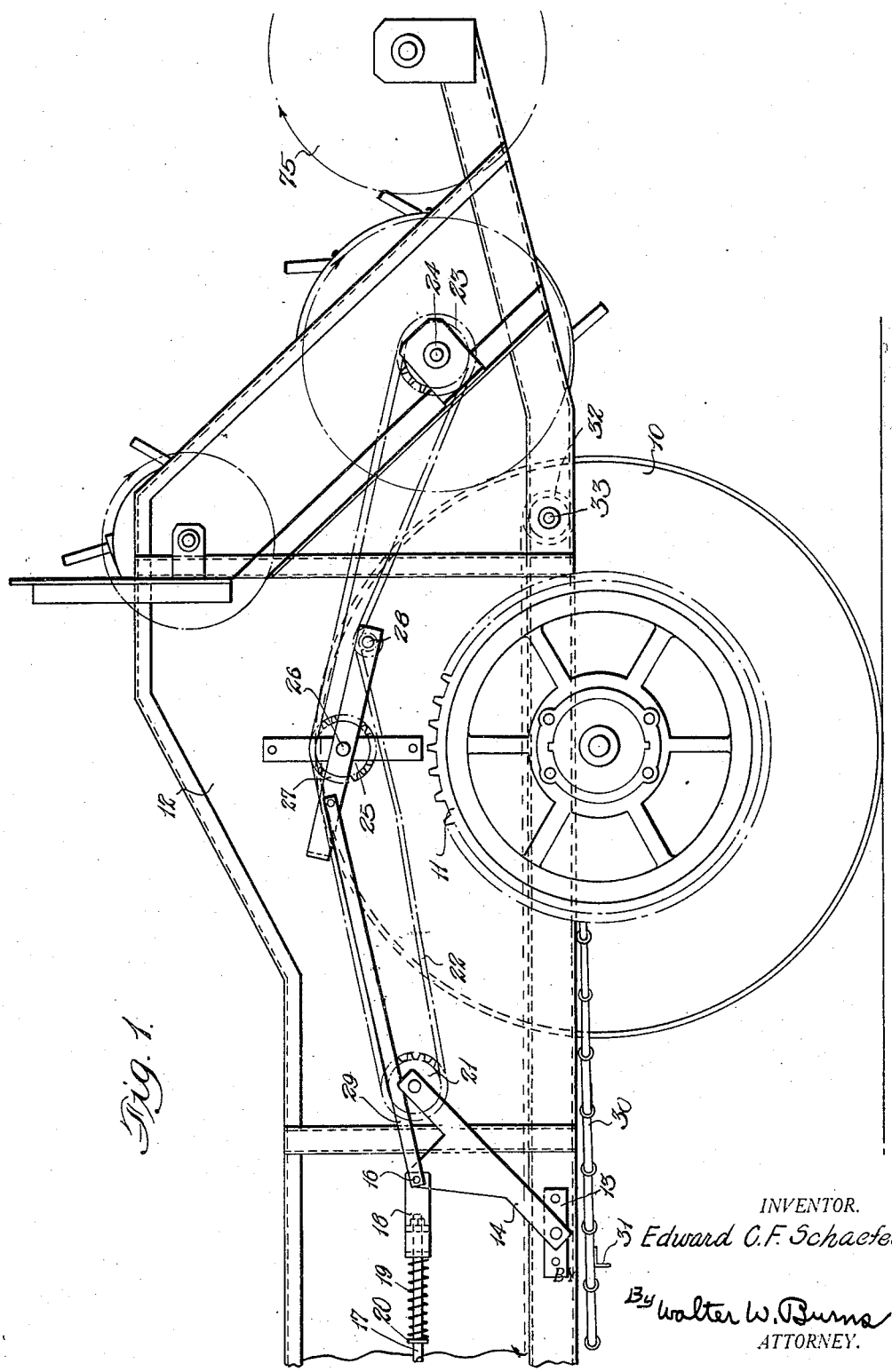

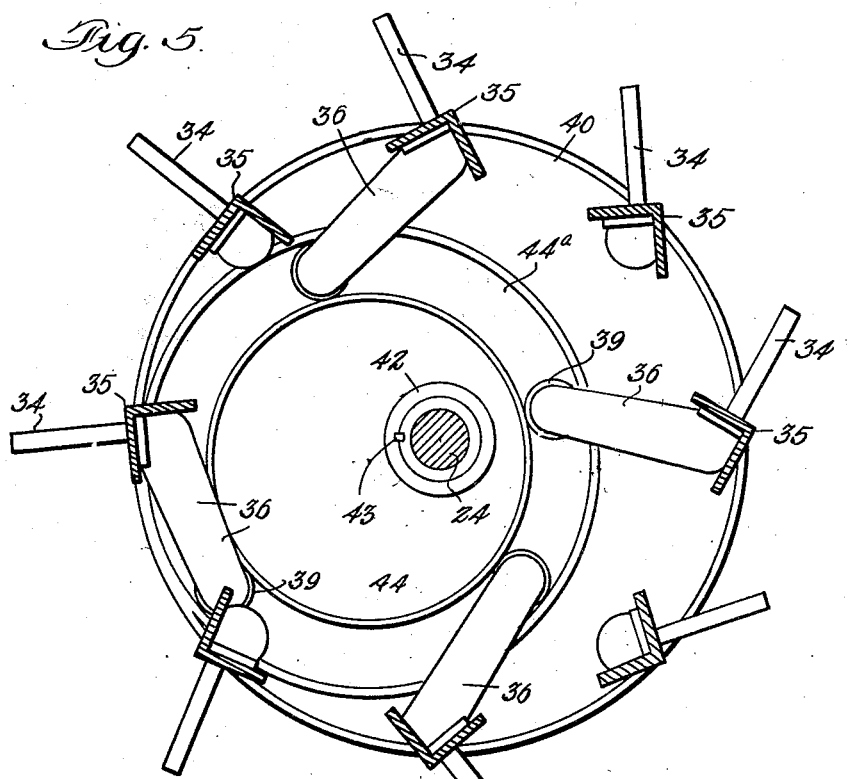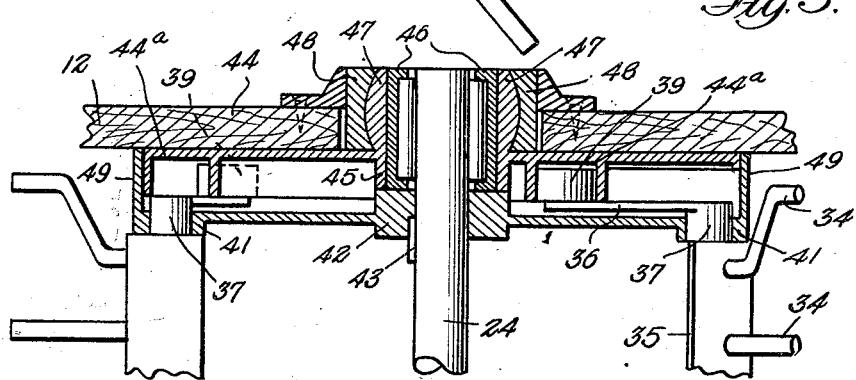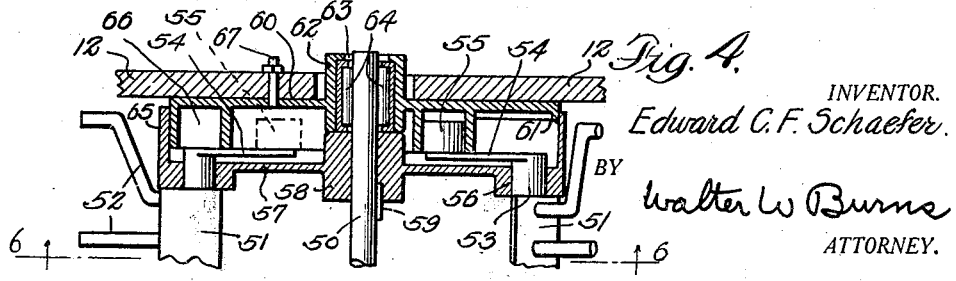

Patented July 1, 1930

1,769,715

UNITED STATES PATENT OFFICE

EDWARD C. F. SCHAEFER, OF YORK, PENNSYLVANIA

MANURE SPREADER

Application filed July 7, 1928. Serial No. 290,900.

This invention relates to an improved manure spreading device and has reference to that type of spreader wherein a discharger, beater and wide-spread device are located at at the rear of a vehicle body to distribute the manure on the ground from the end of a conveyor mechanism in the vehicle body.

In the manure spreader of the type in general use, there is a vehicle body which has on its bottom a conveyor consisting of chains and flights, the flights resting upon the bottom of the vehicle, the conveyor being operated by a feeding mechanism connected to and receiving power from the draft wheels. At the discharge end of the conveyor is a discharger mechanism which moves at its periphery from the bottom of the load, tears portions loose and delivers these separated portions to a widespread device which scatters the load in both directions at the same time shattering, more or less, the lumps delivered from the discharger.

In addition, there is above and forward of the discharger, a cylindrical spike-carrying beater which serves to keep the load at a uniform depth as it approaches the discharger.

Great difficulty has been experienced in keeping the discharger and beater clear of the straw so that they may properly function without the straws catching on the prongs of the beater and discharger and causing what is known among farmers as "wrapping". The wrapping of the beaters and dischargers of manure spreaders is often very annoying as sometimes both of these parts will wrap so quickly that the spreader will have to be stopped several times during the distribution of a single load.

This wrapping has been found to be worse in the case of the beater than in the case of the discharger, probably due to the fact that in the usual construction, the beater is made smaller in diameter than the discharger.

In addition, with the usual beater, the height of the load has to be carefully limited so that the beater may function at all. If the load is piled to a point above the center of the beater, the beater quickly wraps and instead of breaking up and holding back the upper part of the load to cause the load to approach the discharger at a uniform height or thickness, the wrapped beater simply acts as a roller and packs the load hard, thus preventing the proper functioning of the discharger.

The primary object of this invention is the provision of an improved manure spreader having a combination wherein is a discharger which will not wrap and an improved device which acts as a beater under some conditions and a combined beater and discharger under other conditions and which will operate without wrapping.

Another object of this invention is the provision of an improved manure spreader having a means for giving a wiping action to that part of the load approaching the discharger which is below a predetermined height and which will act as an auxiliary discharge if the load is above this predetermined height.

Another and still further object of my invention is the provision of a device for a manure spreader for use in the vicinity of the top of the load which will work to a forward position, portions of the load between certain predetermined levels and will discharge portions of the load above a predetermined level and will withdraw the holding means from the discharged portions of the load.

Other and further objects of the invention will be apparent to one skilled in the art from a reading of the complete specification and claims.

Referring to the drawing where I have illustrated a preferred embodiment of my invention, Fig. 1 is a side view showing the left side of my invention.

Fig. 2 is a view similar to Fig. 1 but in section.

Fig. 3 is a fragmental cross sectional view of the discharger on the line 3—3 of Fig. 2.

Fig. 4 is a fragmental view of the auxiliary discharger and beater taken on the line 4—4 of Fig. 2.

Fig. 5 is a cross sectional view on the line 5—5 of Fig. 3.

Fig. 6 is a cross sectional view on the line 6—6 of Fig. 4.

Similar reference characters refer to the same or similar parts throughout the views of the drawing.

The manure spreader is mounted upon four wheels the rear wheels of which are shown at 10. A large sprocket wheel 11 is driven by the rear wheels 10 which provide power for the operation of the discharging and distributing mechanism.

Mounted on one side of the body 12 of the manure spreader is a bracket 13 to which is pivoted a swinging double arm 14 which in turn carries a pivot 16. To this pivot 16, is pivoted a rod 17 by a link 18. The link 18 is provided with a sliding connection with rod 17. A spring 19 surrounds the rod 17 and rests between the link 18 and the stop 20 on the rod 17.

At the upper end of the double arm 14 is carried a pulley or idler sprocket 21 over which runs a chain 22.

The chain 22 is located above the sprocket wheel 11 and extends over a sprocket wheel 23 which is mounted on a shaft 24. The shaft 24 carries the discharging mechanism to be described.

Intermediate the two sprockets 21 and 23 is an idler pulley or sprocket 25 which is mounted on a stub shaft secured to the side of the spreader body at 26. The idler pulley or sprocket 25 carries the upper reach of the chain 22. The lower reach is carried by two guides at the ends of the inverted U-shaped member 27. In the embodiment herein shown, two small rollers 28 or lugs which are placed on the inside of each side of the inverted U-shaped member 27. The two sides of the inverted U-shaped member 27 are of a distance apart to freely permit of the passage of the chain 22 therebetween. The insides of the small rollers or lugs 28 are of such a distance apart that there is sufficient room for the passage of the sprocket 11 but insufficient room for the passage of the chain 22.

The pivot 26 is placed a sufficient distance above the sprocket wheel 11 to permit the chain 22 to be held clear of the sprocket wheel 11 when a drive connection is not desired. However the pivot 26 is close enough to the sprocket 11 so that when the inverted U-shaped member 27 is swung to a nearly vertical position, the sides of the U-shaped member straddle the sprocket 11, permitting the chain to drop over the teeth of the sprocket, thus establishing a driving connection between the chain and sprocket.

Extending between the inverted U-shaped member 27 and the pivot 16 is a rod 29 which serves to swing the inverted U-shaped member 27 from the position where it holds the chain 22 out of operation, as shown in Fig. 1, to a position where the chain is dropped into operative relation with the sprocket wheel 11.

In operation, the rod 17 is operated by means of a suitable hand lever. When compression is placed in the rod 17, the arm 14 is swung in a clockwise direction as seen in Fig. 1. It will be noted that this lowers the forward portion of the chain 22. But this movement of the arm 14 also places compression in the link 29 and causes the inverted U-shaped arm 27 to assume a vertical position and deposit the chain 22 on the sprocket wheel 11.

As the downward movement of the arm 14 is continued, more of the chain 22 is brought into a position to engage the sprocket wheel 11. The movement of the sprocket wheel 11 in a counter-clockwise direction, as seen in Fig. 1, causes the driving of the chain 22 and consequent driving of the sprocket wheel 23 and the shaft 24, to drive the discharge mechanism as will be later described.

When it is desired to disconnect the chain 22 from the sprocket 11, it is only necessary to operate the hand lever (not shown) which controls the rod 17, to place tension in the latter. This action swings the arm 14 in a counter-clockwise direction toward the position shown in Fig. 1, at the same time swinging the inverted U-shaped member 27, causing the rollers or lugs 28 to lift the chain 22 away from the sprocket wheel 11. The manure spreader or other vehicle may now be moved over the ground without operating the discharging mechanism or any of its coacting parts.

I will now describe the details of the discharging mechanism which is mounted upon the shaft 24.

The discharging mechanism is located at the rear of the rear end of the conveyor which feeds the manure to the discharging mechanism. This conveyor comprises chains 30 and flights 31 which pass over the floor of the vehicle body. At the rear end at 32 are driving sprockets which are driven so that the upper reach of the conveyor, and which rests upon the vehicle body floor, will travel rearwardly at a sufficient speed to supply the manure to permit the discharging mechanism to discharge the load at the desired speed. These driving sprockets 32 are mounted on a suitable shaft 33 which is driven by suitable driving means to cause the upper reach of the conveyor to slide the load along the vehicle bottom at a predetermined speed.

In the embodiment herein illustrated, the discharging mechanism as a whole is mounted to revolve about the axis of the shaft 24. Placed radially about this shaft are circumferentially spaced rows of teeth 34. The teeth are mounted upon angle bars 35 and each angle bar 35 is in turn mounted upon a crank 36, a portion of which is provided with journals 37 of cylindrical cross section. The crank arms 36 at their inner ends carry rollers 39.

Carried by the shaft 24 adjacent each end, is a head in the form of a disk 40 provided with bearings 41 for the journals 37. At the center of the disk 40 is a hub 42 which is keyed to the shaft 24 at 43.

Upon the vehicle body and about the shaft 24 is mounted a relatively stationary drum indicated generally by the reference character 44.

This drum 44 is provided on its inner face with an eccentrically disposed channel 44ᵃ in which the aforesaid rollers 39 are mounted for rotation. In addition, the drum 44 is provided with a hub 45, a portion of which serves to accommodate a roller bearing 46 for the support of the ends of the shaft 24. It will be noticed that the outer end of this hub is constructed to provide a convex enlargement 47 turnable in a bearing 48 of corresponding construction. The purpose of this bearing construction involving the parts 47 and 48 is to permit of the adjustment of the parts at the time of the assembly of the parts. After once being assembled and properly set, the bearing becomes inoperative, the drum 44 being kept in the permanent setting unless it becomes necessary to disassemble the parts for repair or other purposes. In the case of my discharge mechanism, with the angles of the arms 36 to the teeth 34 as shown, I have found that the drum having an eccentric annular channel 44ᵃ with its center forward of the center of the shaft 24, is best placed with its center below the horizontal so that a line between the center of the channel 44ᵃ and the center of the shaft 24 makes an angle of about 17° with the horizontal.

In actual construction on a commercial production basis, the bearing parts 47 and 48 may be dispensed with.

I have found a convenient construction to be one wherein the channels 44ᵃ are arranged adjacent each end of the shaft 24, the alternate rows of teeth 34 being controlled by arms 36 carrying rollers 39 engaging the channel 44ᵃ at one end of the discharge mechanism, the other rows of teeth 34 being controlled by arms 36 and rollers 39 cooperating with channels 44ᵃ at the opposite end of the shaft 24.

On the periphery of the disk 40 is a flange 49, the two revolving together about the periphery of the fixed drum carrying the channel 44ᵃ.

An inspection of the drawing clearly indicates the movement of the teeth in rotation about the axes of the respective journals 37 while the teeth have a bodily revolution about the center of the shaft 24.

As the teeth approach the bottom of the load, they are in a position to tear off portions carrying the same upwardly to a point where the teeth move clear of the load and to the rear. As the portions are carried to the rear by the teeth, it will be observed that the teeth rotate on their respective axes in an opposite direction to the direction of revolution of the teeth in their bodily movement. This backward rotation has the effect to withdraw the teeth from the manure, permitting the same to continue its rearward movement. The same effect in separating the teeth from their respective loads is obtained as may be obtained by the skillful handling of a shovel in withdrawing it from a shovelful of sticky dirt. This withdrawal is assisted in the case of the construction as shown by the fact that the backward movement of the teeth in their backward rotation is a slowing-up action of the teeth while the material being separated from the teeth, tends to continue its movement in a rearward tangential direction. These two features of the movement of the teeth effectually act to entirely clean the manure from the teeth.

It is to be noted that in the structure herein illustrated, when the teeth are in the same horizonal plane with the axis of the shaft 24, the teeth are in a substantial radial position. This is the ideal gathering position. If they are placed so as to have the points move ahead of their supporting ends, greater movement is necessary to clear them of their load.

In the case of the discharge mechanism wherein the teeth move about a fixed center, as illustrated, it has been found that an efficient arrangement is to have the teeth approach but not pass a position where they extend in a radial direction—in other words to have the points of the teeth travel slightly to the rear of their supporting ends.

To take the place of the "beater" of the usual manure spreader, I have provided a new construction which will not only act to beat the manure back to even the load at the point of approach to the discharger but which will, in addition, act as an auxiliary discharger. In some of the commonly used manure spreaders, it is very necessary that the load be not piled so deep that the beater will do more than slightly engage the high spots to knock them down in the low spots to even the height of the load. If the load is piled so that the beater gets more than a slight hold on the load, it will quickly wrap full of the straw and will then act as a roller, merely packing the load harder. The prevention of wrapping of the beater has been a greater problem than the prevention of wrapping of the discharger, great as has been the latter problem.

I have found that by replacing the ordinary beater with a device wherein the supporting portions of the teeth travel ahead of the points during the engagement of that portion of the load which is to be retarded in its approach to the discharger, I am able to beat these portions back to a desirable position to level the load, at the same time not packing the load tighter and thus increasing the work of the discharger.

In order to bring about these results, I have found a very efficient construction is one wherein the teeth in their downward movement begin to engage the load at about 45° to the horizontal. From this position and during the continued upward and forward movement, the teeth rotate and approach a position where the supporting part of the teeth will not be moving much, if any, in advance of the teeth. Near the zenith of the movement of the teeth, the teeth rotate in an opposite direction and if any of the manure has been taken up by the teeth, the rearward rotation of the teeth will clear the teeth of the manure, as will be described.

In the present embodiment of this part of my invention, 50 designates a shaft. About this shaft 50 are mounted pivoted angle bars 51 which carry the teeth 52. At one end of each of the angle bars 51 is located a journal 53, on the end of which is a crank 54 which carries at its other end a roller 55. The journal 53 is capable of partial rotation in a bearing 56. These bearings 56 are spaced about the periphery of a disk 57. The disk 57 is supported by its hub 58 which is suitably keyed to the shaft 50 by the key 59. Secured to the body 12 of the spreader is a disk 60 having at its outer periphery a flange 61 and at its center a bearing holder 62. Within the bearing holder 62 is a bearing 63 which is provided on its inner periphery with anti-friction rollers 64. These anti-friction rollers are so proportioned with relation to the shaft 50 and the bearing holder 62 that a roller bearing is afforded for the shaft 50 and the parts carried thereby. At the outer periphery of the disk 57 is a flange 65 which is of sufficient diameter to permit free movement of the flange 61 without leaving any substantial opening therebetween.

Within the flange 61 and forming a part of the disk 60 is a track or channel 66 to receive the roller 55. The track or channel 66 is not concentric with the axis 50. It may be of any suitable shape as the circular track illustrated in the drawing. In order to hold the disk 60 and the track 66 in proper relation to the other parts, I provide bolts 67 which extend through the side of the body 12 and through the disk 60.

In order to rotate the teeth 52, I may provide the cranks 54 all adjacent one end of the shaft 50 and there provide the cooperating channel 66 for coaction with the roller 55. If found to be desirable, however, there may be a channel 66 located at each side of the manure spreader body, alternate bars 51 being operated from cranks being located at one side of the spreader and the other bars 51 being operated by cranks located at the other side of the spreader.

At the right side of the machine and on the end of the shaft 24 is a sprocket gear 68. Similarly, on the end of the shaft 50 is a sprocket gear 69. Connecting the sprockets 68 and 69 is a chain 70 the purpose of which is to provide a driving connection between the shaft 24 and the shaft 50.

Also situated adjacent the end of the shaft 24 is a sprocket 71 which drives a chain 72, which in turn has a driving connection with a sprocket 73 mounted on a shaft 74. The shaft 74 is situated to the rear of and at substantially the same level as the axis of the shaft 24.

Mounted on the shaft 74 and to be turned when this shaft 74 turns is a suitable widespread. This wide-spread is composed of several blades spaced about the shaft 74 in angular position. These blades are so placed that when the material from the discharger is thrown backwardly, the blades will catch the material and throw the same to either one side of the machine or the other, depending upon the angle at which the blade is set.

The wide-spread which I have designated generally with the reference character 75, by itself forms no part of my invention and will not be further described in detail.

In the operation of my device, any suitable means may be used for feeding the load to the discharger at the rear of the vehicle body. These feeding mechanisms are well known in the art and will not be described in this application.

In the operation of my invention, the wheel 10 operates the chain 22 which in turn operates the shaft 24, 50 and 74 in a clockwise direction as seen in Figures 1 and 2. As the load moves to the rear the teeth 34 of the discharger engage the lower portion of the load and move in an upwardly and forwardly direction, at the same time tearing a portion of the manure from the load. It will be observed that during this movement the teeth 34 are rotating on their axes due to the control of the angle members 35 by the cranks 36, the rollers 39 and the track or channel 44ᵃ. This rotation about the journals 37 is in the same direction as the revolution of the teeth as a whole about the shaft 24 and continues in this direction in the modification herein illustrated until the teeth are substantially at the level of the shaft 24. The track or channel 44ᵃ is so placed that during the upward and rearward movement of the teeth, which is after the material has been separated from the load, the rotation in the journals 37 reverses and continues until the teeth have passed the highest point and are moving in a downward direction.

As the discharger as a whole is revolving swiftly, the material on the teeth will be carried upwardly and to the rear. The above mentioned reversal of rotation of the teeth in their movement, together with the downward movement of the teeth and the rearward movement of the material, causes a separation of the teeth from the material.

The material passes to the rear of the discharger mechanism, strikes the blades of the wide-spread 75 and is thrown to one side or the other of the machine depending upon which blade is encountered.

If the top of the load in the spreader body 12 is very low, the same will not come in contact with the teeth 52. It is the custom, however, for farmers to load these spreaders heavily and, if the load is piled high enough, it will contact with the teeth 52.

The function of a manure spreader is to evenly distribute the load throughout the field. For this reason, it is desirable to have the load approach the discharger at an even height both from side to side and from front to rear. In the loading of manure loaders, there is usually a difference in the height from front to rear as well as from side to side.

In my invention, the teeth 52 are so placed that when the load is piled high enough to encounter them, they will engage the load and exert a sweeping and wiping action to remove the high spots in the load, thus permitting the loose material removed to fall in the low spots. In this connection, it will be noted that the supporting end of the teeth, in the body movement, travels ahead of the points of the teeth. If the points were permitted to travel with or ahead of the supporting ends of the teeth, the result would be that the straw would collect on the teeth and would wind around the angles bars 51 and the whole device would soon become, in effect, a roller.

In my invention, the teeth 51 serve not only to push the material forwardly so as to even the load but in addition thereto, if the load is piled high enough to, for example, approach the teeth 52 when they are moving upwardly and rearwardly, then the teeth 52 operate as additional discharging means at the upper portion of the load, at the same time pushing the material adjacent the teeth on the low portion of the path away from the discharger to even the load in its approach to the discharger.

That material which may be gathered by the teeth in the upper part of their movement is thrown rearwardly on to the swiftly moving discharger or toward the wide-spread. In either case, this material eventually encounters the wide spread and is thrown on to the field as already described.

The channel 66 is so placed that when the teeth 52 are moving downwardly and rearwardly the rotation of the teeth is in a direction opposite to the revolution of the teeth about the shaft 50.

It will thus be seen that in my combination of elements herein described, I have not only prevented the clogging of the discharging mechanism as shown in my Patent No. 1,646,878 which reissued as Reissue Patent No. 16,929, but I have also provided a means whereby the load approaching the discharger will not be packing but will be kept loose and free for action of the discharger and in the case of too high a load, the same means which provides for the even approach of the material to the discharger also provides for an auxiliary discharging function in another part of the movement.

I have found my device constructed as illustrated herein to be one in which it is impossible to cause wrapping. This is true whether the manure is loaded from a pile and carefully distributed over the vehicle body or whether it is loaded directly from the barn in large scoops and dumped directly into the vehicle body 12.

While I have illustrated and described in detail one embodiment of my invention, and indicated others, I desire to have it understood that I do not limit myself to the exact showing and that modifications, variations and changes may be made without departing from the spirit of my invention and within the scope of the appended claims.

Having described my invention what I claim and desire to secure by Letters Patent is:

1. A manure spreader comprising a discharging mechanism, a wide-spread device for receiving manure from the discharging mechanism and spreading the same over a path wider than the length of the wide-spread, teeth means revolving bodily in a path about an axis higher than the bottom of the discharge mechanism and means controlling the teeth to advance the supporting ends of the teeth ahead of their points during the time of contact with relatively low portions of the load and to give the teeth a rotative movement in the same direction as the bodily revolution during the time of contact with the load at a relatively higher level.

2. A manure spreader comprising a discharging mechanism, a wide-spread device for receiving manure from the discharging mechanism and spreading the same over a path wider than the wide-spread length, teeth means revolving bodily in a path about an axis higher than the bottom of the discharge mechanism and means controlling the teeth to hold them in positions to give them a wiping action on the load adjacent their lowest point and to move them rotatively toward a gathering position after passing the low point.

3. A manure spreader comprising a discharging mechanism, a wide-spread device for receiving manure from the discharging mechanism and spreading the same over a path wider than the wide-spread length, teeth means revolving bodily in a path about an axis higher than the bottom of the discharge mechanism and means controlling the teeth to hold them in positions to give them a wiping action on the load adjacent their lowest point, and to rotatably move them in a direction opposite to the direction of revolution after passing the highest point, the teeth retaining the same direction of bodily revolution throughout the cycle of movement.

4. A manure spreader comprising a discharging mechanism, a wide-spread device for receiving manure from the discharging mechanism and spreading the same over a path wider than the length of the wide-spread, teeth means having supporting bars and revolving bodily in a path about an axis higher than the bottom of the discharge mechanism and means controlling the teeth to advance the supporting ends of the teeth ahead of their points during the time of contact with relatively low portions of the load and to give the teeth carrying bars a rotative movement in the same direction as the bodily revolution during the time of contact with the load at a relatively higher level.

5. A manure spreader comprising a discharging mechanism, a wide-spread device for receiving manure from the discharging mechanism and spreading the same over a path wider than the wide-spread length, teeth means having supporting bars and revolving bodily in a path about an axis higher than the bottom of the discharge mechanism and means controlling the teeth to hold them in positions to give them a wiping action on the load adjacent their lowest point and to move them rotatively toward a gathering position after passing the low point.

6. A manure spreader comprising a discharging mechanism, a wide-spread device for receiving manure from the discharging mechanism and spreading the same over a path wider than the wide-spread length, teeth means having supporting bars and revolving bodily in a path about an axis higher than the bottom of the discharge mechanism and means controlling the teeth to hold them in positions to give them a wiping action on the load adjacent their lowest point, and to rotatively move them in a direction opposite to the direction of revolution after passing the highest point, the teeth retaining the same direction of bodily revolution throughout the cycle of movement.

7. A manure spreader comprising a discharging mechanism, a wide-spread device for receiving manure from the discharging mechanism and spreading the same over a path wider than the wide-spread length, teeth, means for supporting and guiding the teeth in a cylindrical path to act upon the upper portion of the load to hold them in positions to give them a wiping action on the load adjacent their lowest point and to move them rotatively toward a gathering position after passing the low point.

8. A manure spreader comprising a discharging mechanism, a wide-spread device for receiving manure from the discharging mechanism and spreading the same over a path wider than the wide-spread length, teeth, means for supporting and guiding the teeth in a cylindrical path to act upon the upper portion of the load and to hold them in positions to give them a wiping action on the load adjacent their lowest point, and to rotatively move them in a direction opposite to the direction of revolution after passing the highest point, the teeth retaining the same direction of bodily revolution throughout the cycle of movement.

9. A manure spreader comprising a discharging mechanism, a wide-spread device for receiving manure from the discharging mechanism and spreading the same over a path wider than the wide-spread length, a hollow cylinder, teeth revolving bodily in the periphery of the cylinder, and in position to act upon the upper portion of the load and means to hold the teeth in position to give them a wiping action on the load adjacent their lowest point and to move them rotatively toward a gathering position after passing the low point.

10. A manure spreader comprising a discharging mechanism, a wide-spread device for receiving manure from the discharging mechanism and spreading the same over a path wider than the wide-spread length, a hollow cylinder, teeth revolving bodily in the periphery of the cylinder, and in position to act upon the upper portion of the load and means to hold the teeth in position to give them a wiping action on the load adjacent their lowest point, and to rotatively move them in a direction opposite to the direction of revolution after passing the highest point, the teeth retaining the same direction of bodily revolution throughout the cycle of movement.

11. A manure spreader comprising a wide-spread device, a discharging mechanism and means for controlling the height of the load as it approaches the discharging mechanism, the discharging mechanism having teeth and means for causing the teeth to follow a path adjacent the bottom of the load and to hold the teeth in gathering position when adjacent the bottom of the load and to move the teeth to a non-gathering position after separating a portion of the manure from the load, the means for controlling the height of the load, having teeth and means for controlling the position of the teeth to give them a wiping action on the load adjacent their lowest point and to move them rotatively toward a gathering position after passing the low point and to move them in an opposite direction of rotation after passing the highest point, the teeth retaining the same direction of bodily revolution during the change in direction of rotation.

12. In a manure spreader having a discharging mechanism, means for controlling the height of the load as it approaches the discharging mechanism, comprising teeth and means for causing the teeth to advance over the load with their supporting ends ahead of the points at the lowest position of the teeth and for causing the points to advance faster than the supporting ends to approach a gathering position as the teeth contact with higher places on the load.

13. In a manure spreader having a discharging mechanism, means for controlling the height of the load as it approaches the discharging mechanism, comprising teeth and means for causing the teeth to advance over the load in a position so that the material will move along the sides of the teeth toward the points thereof when at the lowest position of the teeth and for causing the points of the teeth to be moved relatively to approach a gathering position and simultaneously move the teeth into contact with higher places on the load.

14. In a manure spreader having a discharging mechanism, means for controlling the height of the load as it approaches the discharging mechanism, comprising teeth and means for causing the teeth to advance over the load in a position so that material will move along the sides of the teeth toward the points thereof when at the lowest position of the teeth and for causing the teeth to be moved relatively to their path of movement to approach a gathering position and simultaneously move the teeth bodily to positions contacting with higher places on the load and for then simultaneously moving the teeth downwardly bodily and changing the position of the teeth to cause relative movement of the material on the teeth toward their points.

In testimony whereof I hereunto affix my signature.

EDWARD C. F. SCHAEFER.